United States Patent [19]
Lowe

[11] Patent Number: 6,000,899
[45] Date of Patent: Dec. 14, 1999

[54] BALE HAULER

[76] Inventor: Michael Curtis Lowe, R.R. 2, Box 204, Villisca, Iowa 50864

[21] Appl. No.: 09/184,798

[22] Filed: Nov. 2, 1998

[51] Int. Cl.⁶ ........................................................ B60P 1/02
[52] U.S. Cl. ............................ 414/111; 414/24.5; 414/459; 414/911
[58] Field of Search ........................... 414/24.5, 111, 414/459, 911, 917

[56] References Cited

U.S. PATENT DOCUMENTS

| | | |
|---|---|---|
| 4,076,138 | 2/1978 | Honomichl, Sr. |
| 4,182,590 | 1/1980 | Harkness .................................. 414/24.5 |
| 4,204,789 | 5/1980 | Parks, Jr. .................................. 414/24.5 |
| 4,248,560 | 2/1981 | Roose ...................................... 414/459 X |
| 4,248,561 | 2/1981 | Graves ..................................... 414/24.5 |
| 4,261,676 | 4/1981 | Balling, Sr. ............................... 414/24.5 |
| 4,266,898 | 5/1981 | Jacobsen et al. ........................ 414/24.5 |
| 4,394,103 | 7/1983 | Butler et al. ............................. 414/24.5 |
| 4,426,183 | 1/1984 | Butler ...................................... 414/24.5 |
| 4,652,196 | 3/1987 | Woerman ................................ 414/24.5 |
| 4,673,328 | 6/1987 | Shiels ...................................... 414/917 X |
| 4,902,188 | 2/1990 | Page ........................................ 414/917 X |
| 4,944,648 | 7/1990 | Parr ......................................... 414/483 |
| 5,062,757 | 11/1991 | Eichenauer .............................. 414/24.5 |
| 5,083,892 | 1/1992 | Oswald et al. .......................... 414/917 X |
| 5,165,836 | 11/1992 | Shonka .................................... 414/24.5 X |
| 5,362,189 | 11/1994 | Lindahl .................................... 414/24.5 |
| 5,630,689 | 5/1997 | Willis et al. ............................. 414/111 |

*Primary Examiner*—Janice L. Krizek
*Attorney, Agent, or Firm*—Suiter & Associates PC; Kenneth J. Cool

[57] ABSTRACT

A hauler for manipulating and transporting a bale of material is disclosed. The hauler includes a support frame comprising a pair of elongated, parallel, spaced apart members conjoined at a first end. A manipulating frame comprises a pair of parallel, elongated members spaced apart at a distance not greater than a diameter of the bale, and is disposed between the support frame. A transverse member connects the pair of elongated manipulating frame members. A linkage having first and second pivot points is disposed near the first end of the support frame and is pivotally coupled to the manipulating frame at the first pivot point and pivotally coupled to the support frame at the second pivot point. An actuator is coupled between the support frame and the transverse member and is configured to raise or lower the manipulating frame with respect to the support frame such that the bale may be loaded onto or unloaded from the manipulating frame, and transported when the manipulating frame is in a raised position.

18 Claims, 6 Drawing Sheets

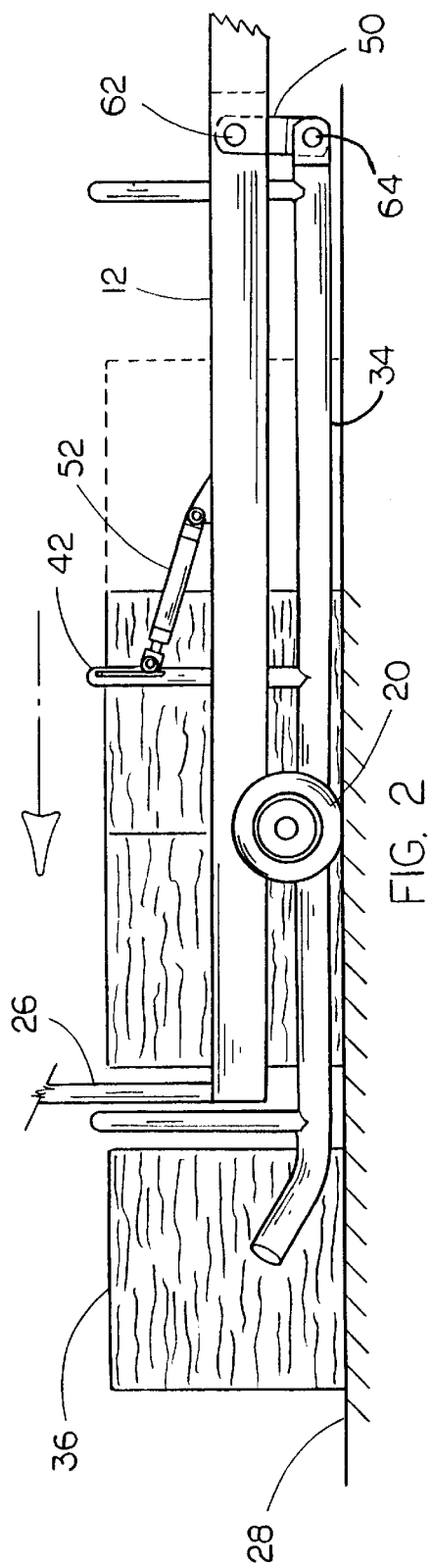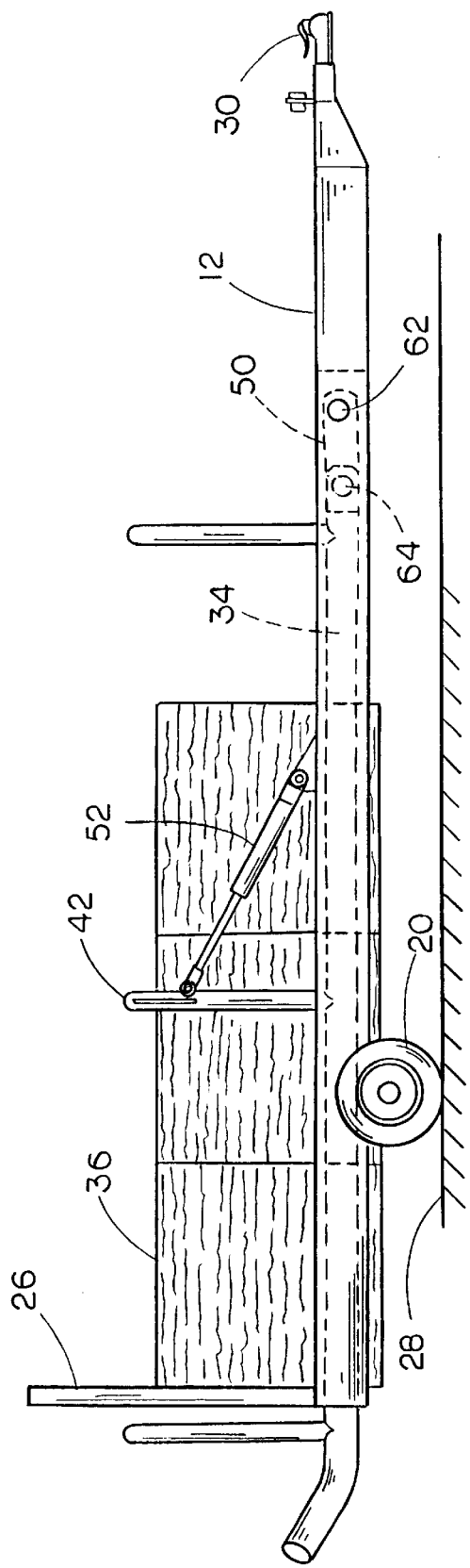

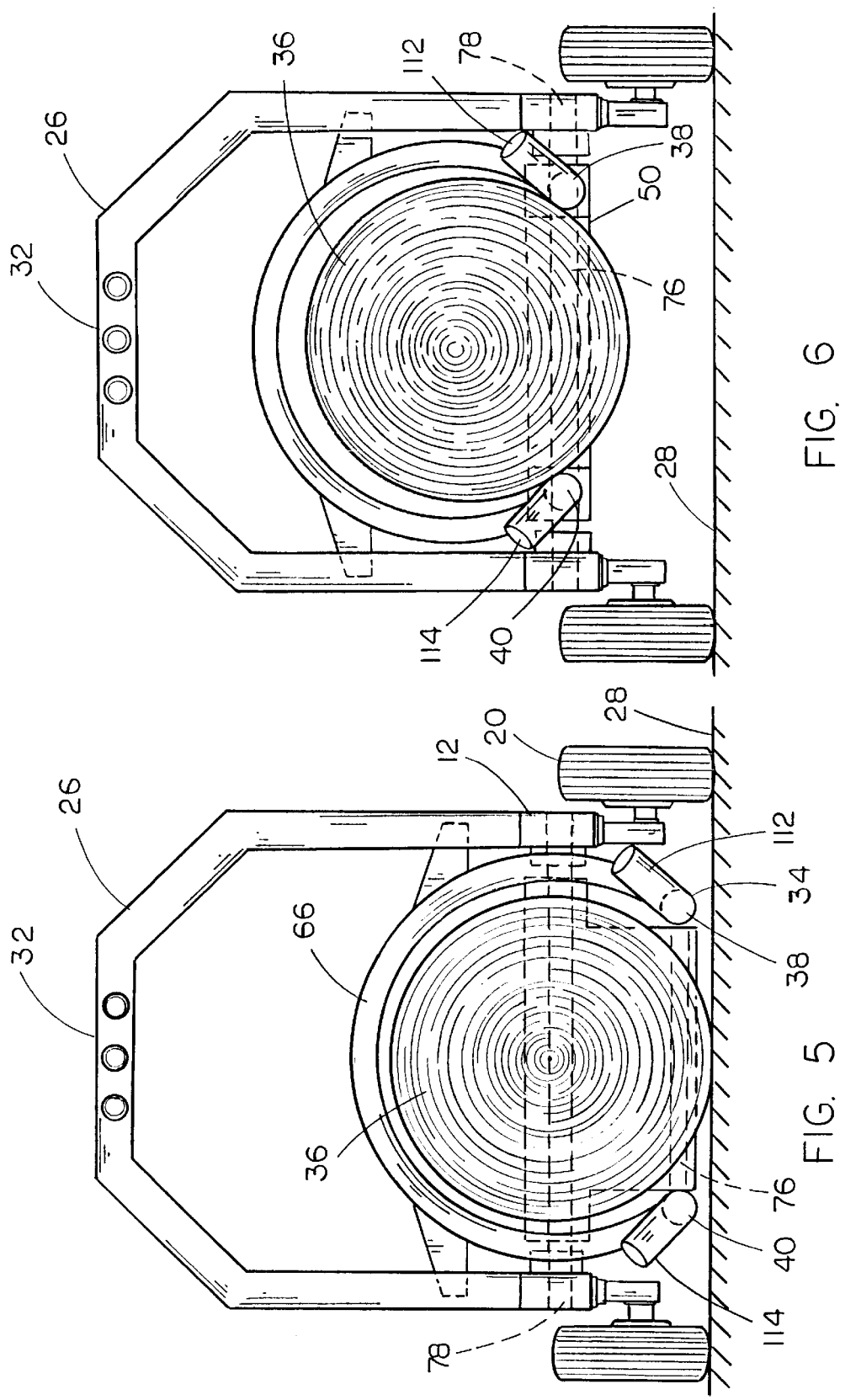

BALE HAULER

FIELD OF THE INVENTION

The present invention generally relates to the field of machines for manipulating material or articles, and specifically to an apparatus for manipulating and transporting bales of material.

BACKGROUND OF THE INVENTION

One of the most physically demanding and time-consuming chores on a farming operation is the baling, loading and hauling of bales of hay. This is especially true for smaller sized family farms where the number of available workers may be limited. After a field has been baled, numerous bales of hay are dispersed throughout the field to be loaded and hauled to a desired destination. Typically, two vehicles are required to transport a load of hay bales, one vehicle having a lift for picking up a bale and loading the bale onto a second vehicle such as a trailer bed for hauling the bales after the bales are loaded. However, using multiple vehicles for a single task is not an efficient allocation of resources, and is impractical for a single person to perform.

Many attempts have been made in the field of bale hauling machinery to provide a combined lifter and carrier for loading and transporting cylindrical bales. However, these attempts have only resulted in exceedingly large, heavy machinery with complex, inelegant loading apparatus that are prohibitively expensive for a smaller farming operation or too large to haul behind a simple passenger vehicle such as a pickup truck. Other attempts have resulted in impractical designs that are exceedingly under-engineered to manipulate multiple larger bales weighing on the order of 1200 to 2000 pounds each. Thus, there lies a need for a bale manipulating and hauling apparatus that is simple and elegant in design so as not to be too large or too expensive for an individual farmer and that may be conveniently and safely transported with a standard passenger towing vehicle on public roads and highways, and yet that is further sturdily engineered to be capable of easily loading and transporting multiple larger sized bales.

SUMMARY OF THE INVENTION

The present invention is directed to a hauler for manipulating and transporting a bale of material. In one embodiment, the hauler includes a support frame comprising a pair of elongated support frame members being parallel, spaced apart and conjoined at a first end of the support frame, a manipulating frame comprising a pair of elongated manipulating frame members being parallel and spaced apart at a distance not greater than a diameter of the bale, said manipulating frame being disposed between the pair of elongated support frame members of the support frame, a transverse member connected between the pair of elongated manipulating frame members such that the parallel, spaced apart relationship of the pair of elongated manipulating frame members is maintained, a linkage having first and second pivot points, the linkage being disposed near the first end of the support frame and being pivotally coupled to the manipulating frame at the first pivot point and being pivotally coupled to the support frame at the second pivot point, and an actuator coupled between one of the elongated support members of the support frame and the transverse member, the actuator being configured to raise or lower the manipulating frame with respect to the support frame such that the bale may be loaded onto or unloaded from the manipulating frame when the actuator places the manipulating frame into a lowered position, and the bale may be transported when the actuator places the manipulating frame into a raised position.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 1 is an isometric view of a bale hauler of the present invention for manipulating and hauling one or more cylindrical bales of hay or the like;

FIG. 2 is a side elevation view of the bale hauler of the present invention showing the hauler in a lowered configuration for loading or unloading of bales onto or from the hauler;

FIG. 3 is a side elevation view of the bale hauler of the present invention showing the hauler in a raised configuration for transporting loaded bales;

FIG. 5 is an end view of the bale hauler of the present invention corresponding to the side elevation view of FIG. 2;

FIG. 6 is an end view of the bale hauler of the present invention corresponding to the side elevation view of FIG. 3;

DETAILED DESCRIPTION OF THE INVENTION

Reference will now be made in detail to the presently preferred embodiment of the invention, an example of which is illustrated in the accompanying drawings.

Figure 1:
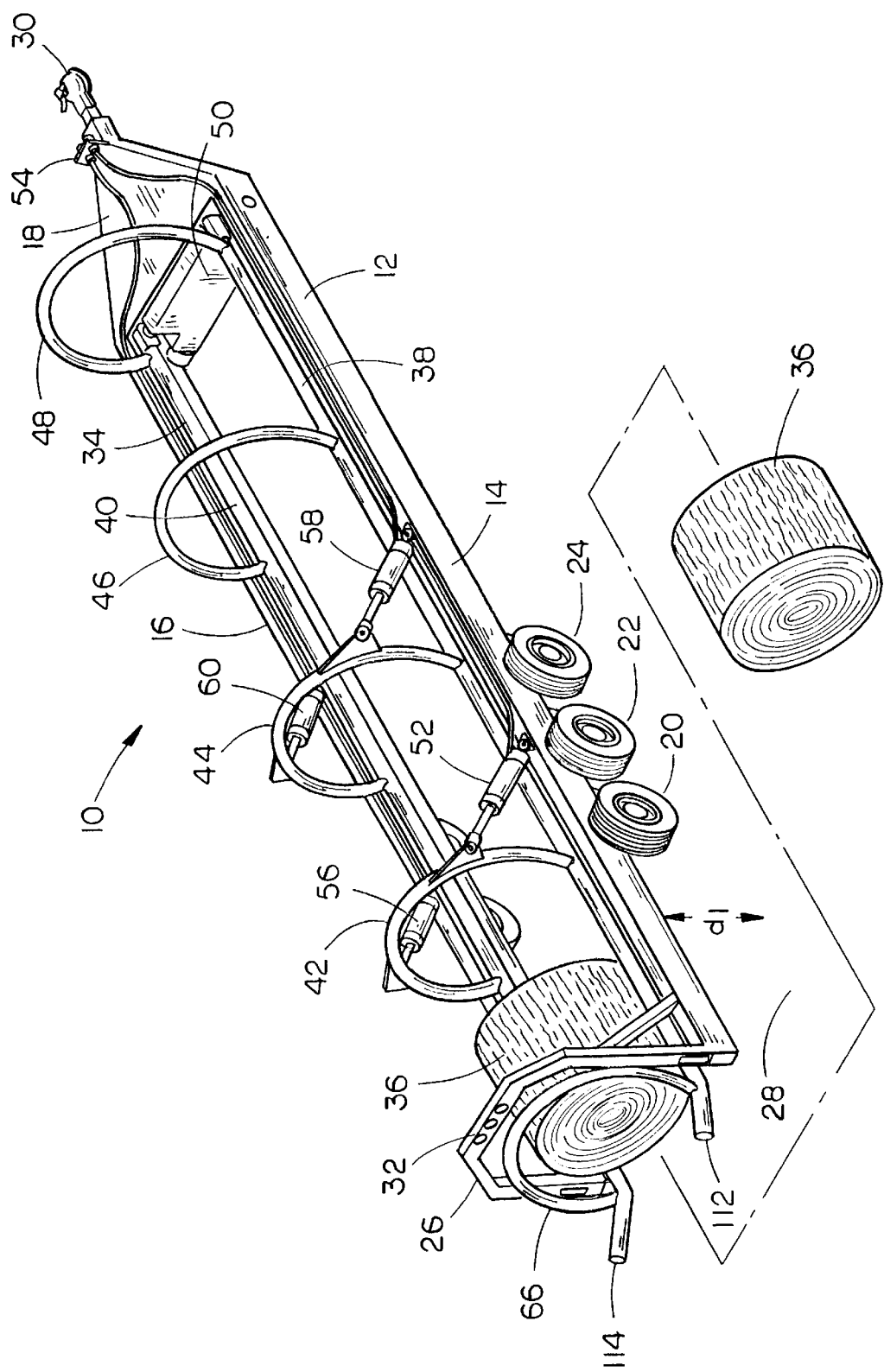

Referring now to FIGS. 1–8, a bale hauler of the present invention for manipulating and hauling one or more cylindrical bales of hay or the like will be discussed. Although the bale hauler as generally depicted in FIG. 1 will be discussed, the discussion further applies to other figures where like reference numerals are indicated. The bale hauler 10 comprises a support frame 12 comprising a pair of elongated support frame members 14 and 16. Elongated support frame members 14 and 16 are disposed in a parallel relationship to each other and are conjoined at a first end 18 of support frame 12. Support frame 12 is supported at a distance $d_1$ above a support surface 28 such as the ground by one or more wheel assemblies 20, 22 or 24. If bale hauler 10 is intended for lighter duty operation (i.e. smaller sized bales), then only one wheel assembly 20 (i.e. two wheels) will be required. More wheel assemblies 22 and 24 may be added, for example, if bale hauler 10 is intended for heavier duty operation (i.e. larger sized bales). Furthermore, the position of wheels 20, 22 or 24 along support frame 12 may be varied in accordance with anticipated loads for maximizing the load handling capacity and the stability of bale hauler 10. Support frame 12 desirably comprises a strong, lightweight material such as metal, for example aluminum or steel. Furthermore, the interior of support frame 12 may be hollowed or include one or more cavities for providing a lighter weight support frame 10 while still maintaining the strength thereof. As shown, support frame 12 has a rigid construction for providing strength and stability to bale hauler 10 especially during bale manipulating and hauling operations. Although not required, a transverse support frame member 26 may be attached to support frame 12 for coupling elongated support frame members 14 and 16. Transverse support frame member 26 may be utilized to provide additional strength stability to support frame 10 such as to prevent undesirable rotational distortion or twisting of support frame 10 and to help maintain elongated support frame members 14 and 16 in a parallel relationship. Furthermore, transverse support frame member 26 may be utilized to display various lights, reflectors or vehicle license numbers as required by regulatory agencies when bale hauler 10 is utilized or transported on public roads and highways. A hitch 30 is provided at the first end 18 of support frame 12 for coupling bale hauler 10 to a transport vehicle such as a tractor or pickup truck. Electrical coupling (not shown) may be disposed on bale hauler 10 for electrically coupling lights 32 disposed on transverse support frame member 26 or any other portion of bale hauler 10 to the electrical system of a transport vehicle.

Bale hauler 10 further includes a manipulating frame or bed 34 that is utilized to load, unload and carry one or more cylindrical bales 36. Manipulating frame 34 comprises a pair of elongated manipulating frame members 38 and 40 that are spaced apart in a parallel relationship with respect to each other. Manipulating frame 34 is disposed between elongated support frame members 14 and 16. A transverse manipulating frame member 42 is connected between the pair of elongated manipulating frame members 38 and 40 such that the parallel relationship of said pair of elongated manipulating frame members 38 and 40 is maintained. Although not necessary, additional transverse manipulating frame members 44, 46 and 48 may be further disposed between elongated manipulating frame members 38 and 40 in a generally spaced apart relationship in order to provide further strength and stability to manipulating frame member 34. As shown in FIGS. 5 and 6, elongated manipulating frame members 38 and 40 may be spaced apart at a distance not greater than the diameter of bales 36 such that manipulating frame members 38 and 40 may be positioned adjacent to bales 36 when loading and unloading while allowing bales 36 be lifted off of support surface 28 and to rest upon manipulating frame members 38 and 40 when manipulating frame 34 is actuated into a raised position for transporting bales 36. A linkage 50 is disposed near the first end 18 of support frame 12 and has two pivot points 62 and 64 for pivotally linking manipulating frame 34 with support frame 12 near the first end 18 of support frame 12. The distance by which pivot points 62 and 64 of linkage 50 are separated determines the distance by which manipulating frame 34 may be lowered with respect to support frame 12. This distance is selected with respect to distance $d_1$ at which support frame is supported above support surface 28. The distance between pivot points 62 and 64 of linkage 50 ideally allow manipulating frame 34 to be lowered parallel to a support surface 28 upon which bales 36 are disposed such that elongated manipulating frame members 38 and 40 may be moved between bales 36 and a support surface 28 while manipulating frame 34 is generally parallel to support surface 28 and to support frame 12 while loading or unloading bales 36 onto or from bale hauler 10. An actuator 52 is coupled between support frame 12 and transverse manipulating frame member 42 to actuate manipulation of manipulating frame 34. Actuator 52 operates to raise or lower manipulating frame 34 with respect to support frame 12 through application or relaxation of force. As shown in FIG. 1, actuator 52 may comprise a hydraulic cylinder for hydraulically raising or lowering manipulating frame 34. Actuator 52 may couple to an actuation system of a transport vehicle (e.g., 68 or 70) such as through an actuation system coupling 54, for example a hydraulic line system. Alternatively, actuator 52 may comprise other types of actuation systems, for example combustion engines or electric motors. An additional actuator 56 may be provided opposite to actuator 52 for even application of actuating force. Further, one or more additional actuators 58 and 60 may be coupled between support frame 12 and additional transverse manipulating frame members 44 as required for heavier duty applications.

Figure 4:
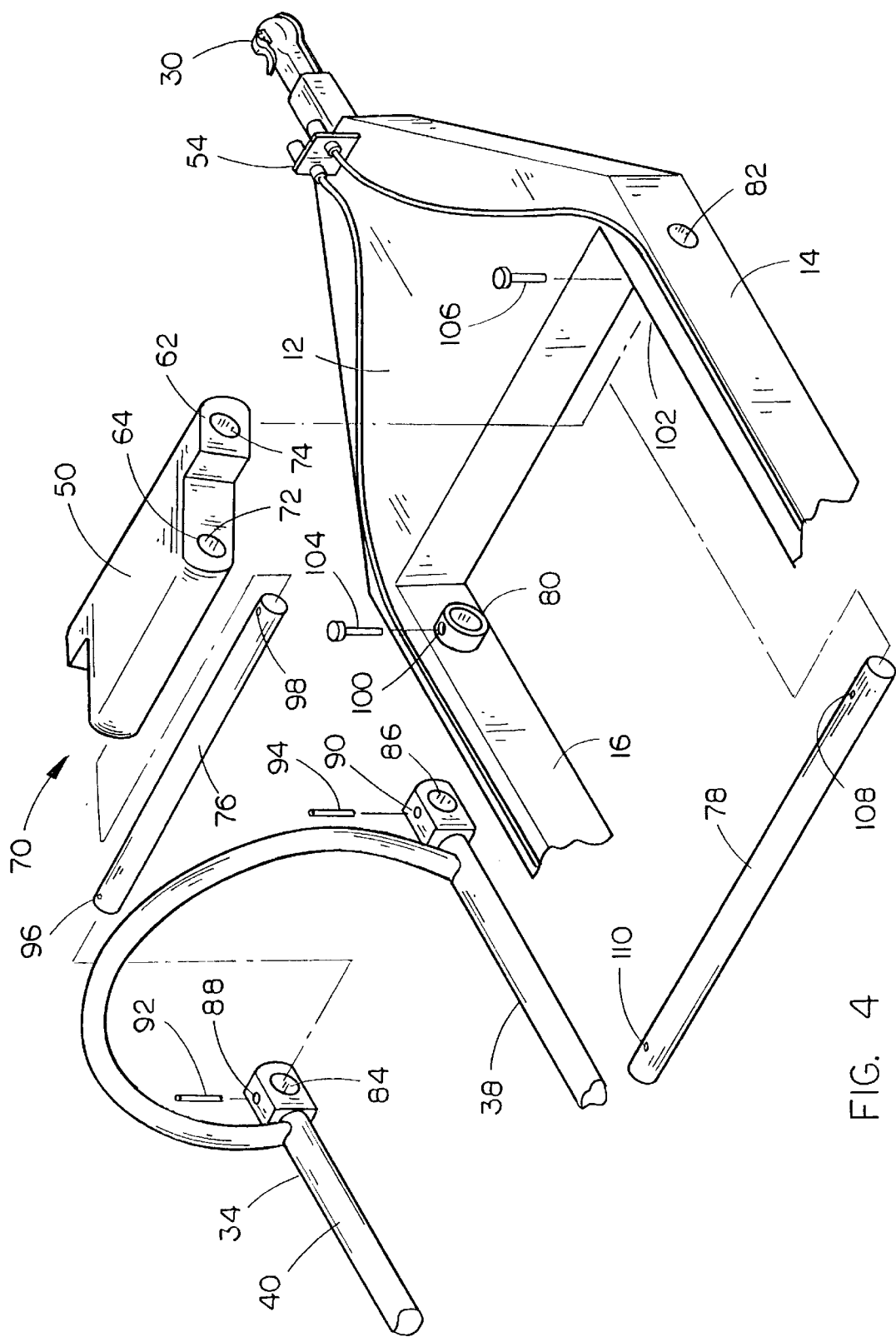
FIG. 4 is an exploded view of a linkage pivot assembly of an embodiment of the bale hauler of the present invention.

Referring now specifically to FIG. 4, a pivot linkage assembly for the bale hauler of the present invention will be discussed. Pivot linkage assembly 70 comprises linkage 50 having pivot points 62 and 64. Linkage 50 has transverse apertures 72 and 74 corresponding to pivot points 62 and 64, respectively, for receiving transverse pivot rods 76 and 78. Transverse pivot rod 78 extends from elongate support frame member 14 to elongate support frame member 16 by passing through aperture 80 to aperture 82 while being disposed through aperture 74 of linkage 50. Likewise, transverse pivot rod 76 extends from elongate manipulating frame member 38 to elongated manipulating frame member 40 by passing through aperture 84 to aperture 86 while being disposed through aperture 72 of linkage 50. Apertures 88 and 90 receive pins 92 and 94 that pass through corresponding apertures 96 and 98 of transverse pivot rod 76 for preventing undesirable axial movement of transverse pivot rod 76. Similarly, apertures 100 and 102 receive pins 104 and 106 that pass through apertures 108 and 110 of transverse pivot rod 78 for preventing undesirable axial movement of transverse pivot rod 78. The pivot linkage assembly 70 shown in FIG. 4 allows manipulating frame 34 to be raised and lowered with respect to support frame 12 in a parallel relationship with respect to a support surface 28 as shown in FIGS. 2-3 and 5-6. It is desirable to position manipulating frame 34 in a parallel relationship with respect to support surface 28 upon which a bale 36 is resting to allow each of the elongate manipulating frame members 38 and 40 to easily pass adjacent bale 38 and adjacent to support surface 28 while loading and unloading such as shown in FIG. 5. As shown in FIGS. 1, 2-3 and 5-8, elongated manipulating frame members 38 and 40 each have an outwardly splayed end 112 and 114, respectively, for assisting in the loading and unloading of bales 36 in the aligning and guiding of a bale 36 onto bale hauler 10. It should be appreciated that various modifications of pivoting linkage assembly 50 may be implemented without departing from the scope of the invention. For example, linkage 50 may comprise two separate pieces, one for each corresponding elongated support frame member 14 and 16, rather than the single unit shown in FIG. 4. Furthermore, each separate piece may be disposed between a manipulating frame member and a support frame member.

Figure 7:
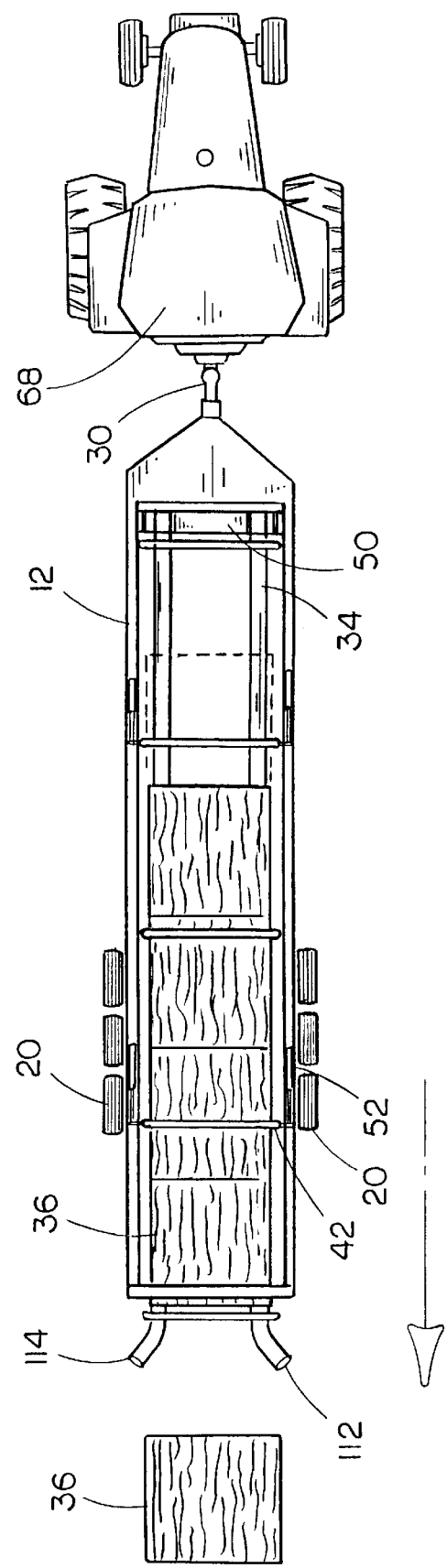
FIG. 7 is a top view of the bale hauler of the present invention illustrating the loading of bales onto the hauler.

Bale hauler 10 operates to load and unload one or more bales in the following manner. As shown in FIG. 7, a towing vehicle 68 positions bale hauler 10 by aligning bale hauler 10 longitudinally with the longitudinal axis of a bale 36.

Figure 8:
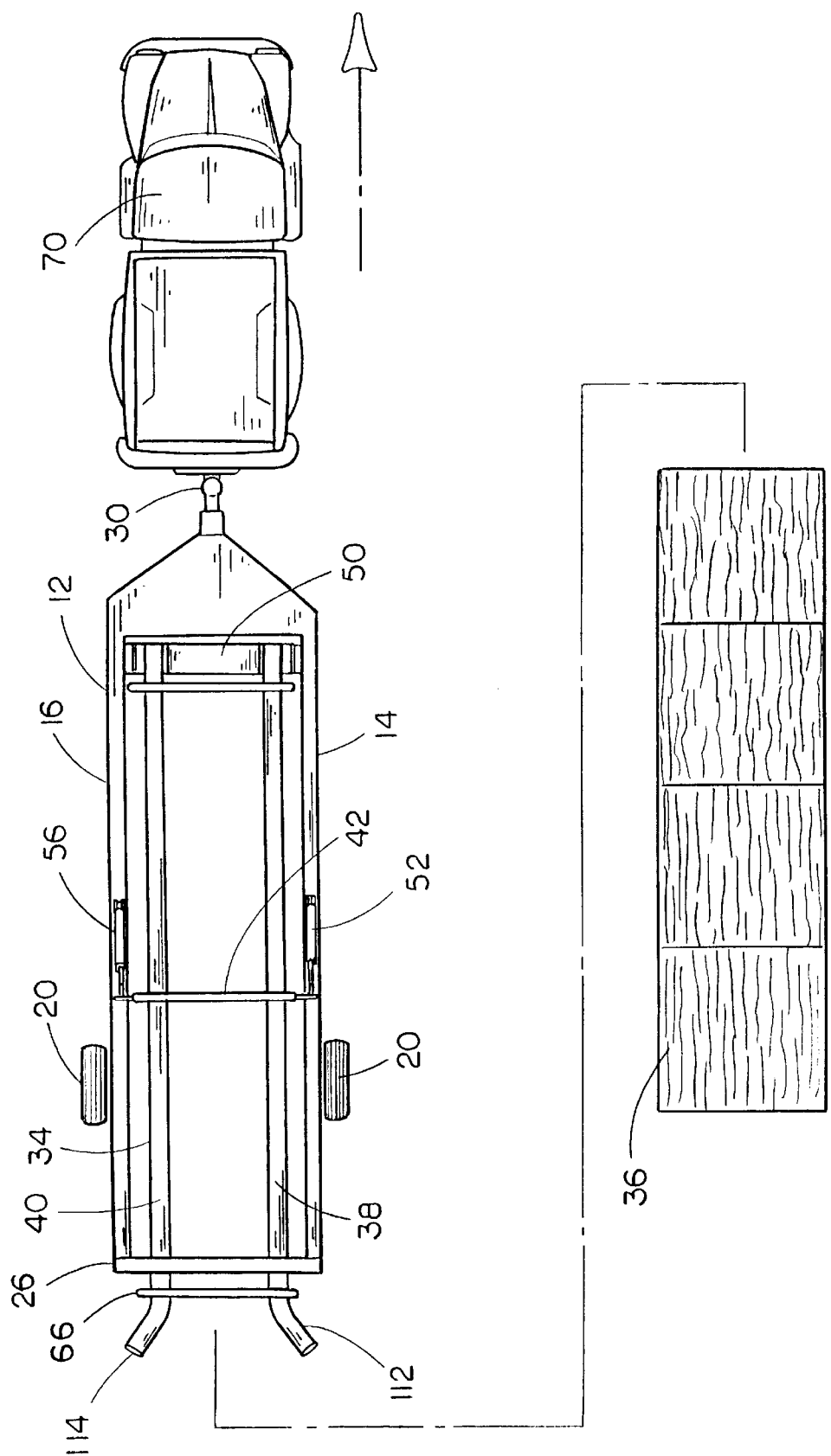
FIG. 8 is a top view of the bale hauler of the present invention illustrating the unloading of bales from the hauler.

Prior to loading, actuator 52 places manipulating frame 34 into a lowered position as shown in FIGS. 2 and 5. Bale hauler 10 is then propelled toward bale 36 in a direction indicated by the arrows shown in FIGS. 2 and 7. As bale hauler 10 advances toward bale 36, elongated manipulating frame members 38 and 40 pass between support surface 28 and bale 36. Friction between bale 36 and support surface 28 maintains bale 36 in position as manipulating frame 34 advances past bale 36. In the event one or more previous bales 36 have already been loaded onto bale hauler 10, these bales may also be advanced toward the first end 18 of bale hauler thereby making space available on manipulating frame for the next loaded bale. After a bale 36 is loaded onto manipulating frame 34, actuator 52 raises manipulating frame to a raised position as shown in FIGS. 3 and 6 such that bales 36 are raised above support surface 28 at a height sufficient for transportation wherein bales 36 are supported by manipulating frame 34. Once bale hauler 10 arrives at a destination for unloading bales 36, actuator 52 places manipulating frame 34 into a lowered position as shown in FIGS. 2 and 5 such that bales 36 come into resting contact with support surface 28. Bales 36 may be unloaded by advancing bale hauler 10 in a direction as indicated by the arrow of FIG. 8 through the operation of towing vehicle 70. Bales 36 remain in frictional contact with support surface 28 as elongated manipulating frame members 38 and 40 advance past bales 36, leaving behind bales 36 in a linear arrangement as shown in FIG. 8.

It is believed that the bale hauler of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A hauler for manipulating and transporting a bale of material, comprising:
   a support frame comprising a pair of elongated support frame members being parallel, spaced apart and conjoined at a first end of said support frame;
   a manipulating frame comprising a pair of elongated manipulating frame members being parallel and spaced apart at a distance not greater than a diameter of the bale, said manipulating frame being disposed between the pair of elongated support frame members of said support frame;
   a transverse member connected between the pair of elongated manipulating frame members such that the parallel, spaced apart relationship of said pair of elongated manipulating frame members is maintained;
   a linkage having first and second pivot points, said linkage being disposed near the first end of said support frame and being pivotally coupled to said manipulating frame at the first pivot point and being pivotally coupled to said support frame at the second pivot point; and
   an actuator coupled between one of said elongated support members of said support frame and said transverse member, said actuator being configured to raise or lower said manipulating frame with respect to said support frame such that the bale may be loaded onto or unloaded from said manipulating frame when said actuator places said manipulating frame into a lowered position, and the bale may be transported when said actuator places the manipulating frame into a raised position.

2. A hauler as claimed in claim 1, further comprising a wheel assembly coupled to said elongated support frame members for supporting said support frame at a constant distance above a support surface.

3. A hauler as claimed in claim 2, said first and second pivot points being spaced apart by a pivot distance being less than the constant distance at which the support frame is supported above the support surface.

4. A hauler as claimed in claim 1, said support frame being supported above a support surface at a constant distance as said manipulating frame is raised or lowered.

5. A hauler as claimed in claim 1, said elongated support frame members comprising a unitary structure.

6. A hauler as claimed in claim 1, said linkage having a first surface, the first surface being parallel to said support frame when said manipulating frame is in a raised position.

7. A hauler as claimed in claim 1, said first and second pivot points being coplanar with said support frame when said manipulating frame is in a raised position.

8. A hauler as claimed in claim 1, said first and second pivot points being aligned along a line being essentially perpendicular to said support frame when said manipulating frame is in a lowered position.

9. A hauler as claimed in claim 1, said manipulating frame and said linkage being essentially coplanar when said manipulating frame is in a raised position.

10. A hauler as claimed in claim 1 further comprising a trailer hitch disposed at the first end of said support frame for coupling the hauler to a towing vehicle.

11. A hauler as claimed in claim 10, said support frame remaining in a fixed position with respect to said trailer hitch as said manipulating frame is raised or lowered.

12. A hauler as claimed in claim 1, said support frame and said manipulating frame being of sufficient strength to manipulate and transport at least eight bales each weighing approximately twelve-hundred to two-thousand pounds.

13. A hauler as claimed in claim 1, said actuator being a hydraulic cylinder.

14. A hauler as claimed in claim 1, said transverse member having a curved design for allowing the bale to pass therethrough.

15. A hauler as claimed in claim 1, said support frame remaining parallel to a support surface as said manipulating frame is raised or lowered.

16. A hauler as claimed in claim 1, said elongated support frame members being rigidly conjoined.

17. A hauler as claimed in claim 1, said manipulating frame members of said manipulating frame each having an outwardly splayed end to assist in load and unloading of the bale onto and off of the hauler.

18. A hauler as claimed in claim 1, further comprising a wheel assembly coupled to said support frame at a position along said elongated support frame members such that a resulting load distribution is optimized when a maximum number of bales is loaded onto said manipulating frame.

* * * * *